United States Patent [19]

Müller et al.

[11] 4,288,566

[45] Sep. 8, 1981

[54] PROCESS FOR THE PRODUCTION OF HIGHLY ELASTIC FOAMS CONTAINING URETHANE GROUPS FROM POLYETHERS, MODIFIED POLYISOCYANATES AND CROSS-LINKING AGENTS

[75] Inventors: Hanns P. Müller, Odenthal; Hansjürgen Rabe; Kuno Wagner, both of Leverkusen, all of Fed. Rep. of Germany

[73] Assignee: Bayer Aktiengesellschaft, Leverkusen, Fed. Rep. of Germany

[21] Appl. No.: 120,250

[22] Filed: Feb. 11, 1980

[30] Foreign Application Priority Data

Feb. 22, 1979 [DE] Fed. Rep. of Germany ....... 2906879

[51] Int. Cl.³ .............................................. C08G 18/14
[52] U.S. Cl. .................................... 521/158; 521/159; 521/160; 521/161; 521/163; 521/167; 521/172; 521/173; 521/174; 521/176
[58] Field of Search ............... 521/158, 159, 160, 161, 521/163, 167, 172, 173, 174, 176

[56] References Cited

U.S. PATENT DOCUMENTS

| | | | |
|---|---|---|---|
| 3,945,939 | 3/1976 | Barron | 521/176 |
| 3,993,576 | 11/1976 | Barron | 521/176 |
| 4,060,439 | 11/1977 | Rosemund et al. | 521/176 |
| 4,105,595 | 8/1978 | Eisenmann | 521/159 |
| 4,107,102 | 8/1978 | Dahm et al. | 521/176 |
| 4,187,354 | 2/1980 | Wagner | 521/158 |
| 4,187,355 | 2/1980 | Wagner | 521/158 |
| 4,187,356 | 2/1980 | Wagner | 521/158 |

FOREIGN PATENT DOCUMENTS

| | | | |
|---|---|---|---|
| 1088523 | 10/1980 | Canada | 260/233.2 |
| 1088558 | 10/1980 | Canada | 260/470.1 |

Primary Examiner—Maurice J. Welsh
Attorney, Agent, or Firm—Gene Harsh; Joseph C. Gil; Lyndanne M. Whalen

[57] ABSTRACT

The invention is directed to a process for the production of highly elastic, open-celled foams containing urethane groups by reacting polyether polyols with modified polyisocyanates in the presence of cross-linking agents and water characterized in that the reaction is carried out in the presence of 0.5 to 10 g/100 g of the polyether of a cross-linking mixture corresponding to the general formula $$C_nH_{2n+2}O_n$$

wherein n=2 to 10, which has a statistical average of at least four hydroxyl groups per molecule.

8 Claims, No Drawings

PROCESS FOR THE PRODUCTION OF HIGHLY ELASTIC FOAMS CONTAINING URETHANE GROUPS FROM POLYETHERS, MODIFIED POLYISOCYANATES AND CROSS-LINKING AGENTS

BACKGROUND OF THE INVENTION

The invention relates to a process for the production of highly elastic, open-celled foams containing urethane groups by reacting polyether polyols with modified polyisocyanates in the presence of cross-linking agents and water, optionally in the presence of catalysts, emulsifiers, stabilizers and organic blowing agents characterized in that the reactions are carried out in the presence of cross-linking mixtures corresponding to a specified general formula.

Flexible elastic polyurethane foams have been used very widely in the upholstery industry for the production of padding for seats and back rests. Flexible elastic foams should be comfortable to sit on like foams composed of natural latex or like a combination of conventional padding materials such as spring interiors with natural hair or wadding. The quality of the padding can be determined by the compression factor known as the SAG factor and by the shape of the force-deformation characteristic curves. The SAG factor is the quotient of the hardness numbers at 65% and 25% impression, the total deformation being kept constant for one minute in each case. The SAG factor should be higher than 2.5 in order to obtain a good padding properties, and the force-deformation characteristic curves should not exhibit a plateau, i.e. only slight changes in deformation should occur when the force is changed slightly rather than large changes in deformation. Foams used in the upholstery industry should also be as strong as possible in order to prevent the material from tearing when a mechanical stress is applied, for example when the padding is covered with textiles. Such foams also should be as hard as possible at a given bulk density (kg/m$^3$). Foams having bulk densities from 15 to 40 kg/m$^3$ are particularly advantageous economically.

In order to meet these various requirements, attempts have been made to use inert organic or inorganic fillers. It is known to add solid additives to one of the components serving as a foaming agent or directly to the foaming mixture itself, for example by adding fillers directly to the mixing chamber of a foaming machine. Additionally, attempts have been made to carry out polymerization in the polyols used for foaming. For example, dispersions of copolymers of styrene and acrylonitrile in polyethers containing hydroxyl groups are commercially available. However, foams having high degrees of rigidity at a predetermined bulk density cannot be produced or can be produced only with considerable difficulties by methods known in the art.

The objects of the present invention are to overcome these disadvantages and, in addition, to provide foams which can be produced in a commercially simple manner with a wide range of bulk densities and which have high degrees of rigidity at predetermined bulk densities.

These objects can surprisingly be achieved if polyurethane foams are produced from polyether polyols, modified polyisocyanates, water, catalysts, emulsifiers, stabilizers and optionally organic blowing agents, in the presence of the cross-linking agents used in the invention. It is extremely surprising that modified isocyanates already having branch points in the molecule could be combined with the cross-linking agents of the invention to produce highly elastic foams with the desired higher degrees of rigidity since these properties would be expected to be mutually exclusive. Previous experience has shown that a higher degree of cross-linking generally gives rise to products which are more brittle. However, by using the present process, it is possible to produce foams similar in nature to latex foams, but having greater rigidity.

DESCRIPTION OF THE INVENTION

The present invention relates to a process for the production of highly elastic foams containing urethane groups and having increased indentation hardness (at least 15–100% higher indentation hardness than standard qualities) by reacting polyethers having a molecular weight of from 400 to 10,000 and containing at least two hydroxyl groups with modified polyisocyanates in the presence of cross-linking agents and water and optionally in the presence of catalysts, emulsifiers, stabilizers, organic blowing agents and other auxiliaries and additives, characterized in that the reaction is carried out in the presence of from 0.5 to 10, preferably from 2 to 5 g/100 g of the polyether, of a cross-linking mixture corresponding to the general formula $$C_nH_{2n+2}O_n$$

wherein n=2 to 10, which has a statistical average of at least four hydroxyl groups per molecule. Modified polyisocyanates are polyisocyanates which contain carbodiimide groups, urethane groups, allophanate groups, isocyanurate groups, urea groups or biuret groups, either alone or in combination. It is preferred to add water to the cross-linking mixture in a quantity of from 5 to 50 g/100 g of cross-linking agents. It is also preferred to add urea and/or ε-caprolactam to the cross-linking mixture or to the mixture of cross-linking agent and water, in quantities of from 5 to 30 g/100 g of cross-linking agent or from 10 to 40 g/100 g cross-linking agent, respectively.

It is also preferred to use a toluylene diisocyanate containing allophanate groups, biuret groups, isocyanurate groups or carbodiimide groups as the polyisocyanate.

The following are used for carrying out the process of the invention.

Starting components include aliphatic, cycloaliphatic, araliphatic, aromatic and heterocyclic modified isocyanates. Suitable modified polyisocyanates containing allophanate groups include those described, e.g., in British Pat. No. 994,890, Belgian Pat. No. 761,626 and Netherlands Patent Application No. 7,102,524. Suitable modified polyisocyanates containing isocyanurate groups include those described, e.g. in U.S. Pat. No. 3,001,973, German Pat. Nos. 1,022,789; 1,222,067 and 1,027,394 as well as German Offenlegungsschriften Nos. 1,929,034 and 2,004,048. Suitable modified polyisocyanates containing urethane groups include those described, e.g., in Belgian Pat. No. 752,261 or in U.S. Pat. Nos. 3,394,164 and 3,644,457. Suitable modified polyisocyanates containing acylated urea groups include those described in German Pat. No. 1,230,778. Suitable modified polyisocyanates containing biuret groups include those described, e.g., in U.S. Pat. Nos. 3,124,605 and 3,201,372, as well as in British Pat. No. 889,050. Suitable polyisocyanates produced by telomerization reactions include those described, e.g., in U.S. Pat. No. 3,654,106. Suitable polyisocyanates containing ester groups are described, e.g. in British Pat. Nos. 965,474 and 1,072,956, U.S. Pat. No. 3,567,763 and German Pat. No. 1,321,688. Starting components also include the reaction products of the above-mentioned isocyanates with acetals according to German Pat. No. 1,072,385 and polyisocyanates containing polymeric fatty acids according to U.S. Pat. No. 3,455,883.

Preferred polyisocyanates include modified polyisocyanates which are derived from 2,4'-diphenylmethane diisocyanate and contain carbodiimide groups, urethane groups, allophanate groups, isocyanurate groups, urea groups or biuret groups.

Starting components also include polyethers having a molecular weight generally ranging from 400 to 10,000, preferably from 3,000 to 6,000, and containing at least two hydroxyl groups. Polyesters, polythioethers, polyacetals, polycarbonates and polyesteramides in smaller amounts (0.5 to 50, preferably 1 to 30% by weight, based on polyether) optionally may be used with the polyethers.

Suitable polyethers containing at least 2, generally 2 to 8 and preferably 2 to 3, hydroxyl groups are those of the type generally known. They are prepared, for example, by polymerization of epoxides such as ethylene oxide, propylene oxide, butylene oxide, tetrahydrofuran, styrene oxide or epichlorohydrin each on its own, e.g. in the presence of Lewis catalysts such as borontrifluoride. The polyethers also may be prepared by addition of these epoxides, preferably ethylene oxide and propylene oxide, either as mixtures or successively, to starting components with reactive hydrogen atoms such as water, alcohols, ammonia or amines. Examples of such starting components include ethylene glycol, propylene glycol-(1,3) or -(1,2), trimethylol propane, glycerine, sorbitol, 4,4'-dihydroxy diphenylpropane, aniline, ethanolamine or ethylene diamine. Sucrose polyethers of the type described in German Auslegeschriften Nos. 1,176,358 and 1,064,938 as well as polyethers which are started on formitol or formose (German Offenlegungsschriften Nos. 2,639,083 and 2,737,951) can also be used. In many cases, it is preferable to use those polyethers which contain predominantly primary OH-groups (i.e. up to 90% by weight based on all the OH-groups in the polyether).

The polythioethers include, in particular, the condensation products of thiodiglycol with itself and/or with other glycols, dicarboxylic acids, formaldehyde, amino carboxylic acids or amino alcohols. Depending on the co-component, the products include, e.g., polythio mixed ethers, polythioether esters or polythioether ester amides.

Suitable polyacetals include, e.g., compounds which can be produced from glycols such as diethylene glycol, triethylene glycol, 4,4'-dioxyethoxy-diphenyl dimethylmethane, hexanediol and formaldehyde. Suitable polyacetals may also be produced by polymerization of cyclic acetals such as trioxane (German Offenlegungsschrift No. 1,649,128).

Polycarbonates containing hydroxyl groups include those of the type generally known which can be produced, e.g., by the reaction of diols such as propane diol-(1,3), butane diol-(1,4) and/or hexane diol-(1,6), diethylene glycol, triethylene glycol, tetraethylene glycol or thiodiglycol with diaryl carbonates, e.g., with diphenyl carbonate or phosgene (German Auslegeschriften No. 1,694,080; 1,915,908 and 2,221,751 and German Offenlegungsschrift No. 2,605,024).

The polyester amides and polyamides include, e.g., the predominantly linear condensates prepared from polybasic saturated or unsaturated carboxylic acids or their anhydrides and polyhydric saturated or unsaturated amino alcohols, diamines, polyamines and mixtures thereof.

The polyesters containing hydroxyl groups which optionally can be used include, e.g., the reaction products of polyhydric, preferably dihydric and optionally trihydric alcohols with polybasic, preferably dibasic, carboxylic acids. Instead of using the free polycarboxylic acids, the polyesters may be prepared from the corresponding polycarboxylid acid anhydrides or corresponding polycarboxylic acid esters of lower alcohols or mixtures thereof. The polycarboxylic acids may be aliphatic, cycloaliphatic, aromatic and/or heterocyclic and may be substituted, e.g., by halogen atoms and/or may be unsaturated.

Examples of suitable carboxylic acids and their derivatives include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene, tetrahydrophthalic acid anhydride, glutaric acid anhydride, maleic acid, maleic acid anhydride, fumaric acid, dimerized and trimerized unsaturated fatty acids, which may be mixed with monomeric unsaturated fatty acids such as oleic acid. Derivatives of carboxylic acids also include terephthalic acid dimethyl ester and terephthalic acid-bis-glycol ester.

Suitable polyhydric alcohols include, e.g., ethylene glycol, propylene glycol-(1,2) and -(1,3), butylene glycol-(1,4) and -(2,3), hexanediol-(1,6), octanediol-(1,8), neopentylglycol, 1,4-bis-hydroxymethylcyclohexane, 2-methyl-1,3-propanediol, glycerine, trimethylol propane, hexanetriol-(1,2,6), butanetriol-(1,2,4), trimethylolethane, pentaerythritol, quinitol, mannitol and sorbitol, formitol, methylglycoside, diethylene glycol, triethylene glycol, tetraethylene glycol and higher polyethylene glycols, dipropylene glycol and higher polypropylene glycols, dibutylene glycol and high polybutylene glycols. The polyesters may also contain a proportion of carboxyl end groups. Polyesters of lactones, such as $\epsilon$-caprolactone, or hydroxycarboxylic acids, such as $\omega$-hydroxycaproic acid also may be used.

Polyhydroxyl compounds already containing urethane or urea groups as well as optionally modified natural polyols such as castor oil or carbohydrates, such as starch, may also be used. Moreover, addition products of alkylene oxides to phenol formaldehyde resins or to urea formaldehyde resins also may be used in the invention.

The above-mentioned polyhydroxyl compounds may optionally be modified in a wide variety of ways before they are used in the polyisocyanate polyaddition process. Thus, according to German Offenlegungsschriften 2,210,839 (U.S. Pat. No. 3,849,515) and 2,544,195, a mixture of various polyhydroxyl compounds (for example of one polyether and one polyester polyol) may be condensed to a polyol having a higher molecular weight by etherification in the presence of a strong acid. The resulting polyol is made up of various segments joined together by means of ether bridges. It is also possible to introduce amide groups into the polyhydroxyl compounds (German Offenlegungsschrift No.

2,559,372) or to introduce triazine groups by reaction with polyfunctional cyanic acid esters (German Offenlegungsschrift No. 2,620,487). Polyhydroxyl compounds containing guanidine, phosphonoformamidine or acyl urea groups are obtained by reacting a polyol with less than an equivalent quantity of a diisocyanato carbodiimide and by subsequent reaction of the carbodiimide group with an amine, amide, phosphite or carboxylic acid (German Offenlegungsschriften Nos. 2,714,289; 2,714,292 and 2,714,293). It is preferred, in some cases, to convert the polyhydroxyl compounds of higher molecular weight completely or partially into the corresponding anthranilic acid esters by reaction with isatoic acid anhydride, as described in German Offenlegungsschriften Nos. 2,019,432 and 2,619,840 or U.S. Pat. Nos. 3,808,250; 3,975,428 and 4,016,143. Compounds of higher molecular weight with terminal aromatic amino groups may be obtained in this way.

Higher molecular weight compounds containing terminal amino groups may be obtained by reacting NCO prepolymers with enamines, aldimines or ketimines containing hydroxyl groups and by subsequent hydrolysis (German Offenlegungsschrift No. 2,546, 537 and U.S. Pat. No. 3,865,791). Other methods of producing higher molecular weight compounds with terminal amino groups or hydrazide groups are described in German Offenlegungsschrift No. 1,694,152 (U.S. Pat. No. 3,625,871).

Representatives of those compounds which may be used in the invention are described, e.g., in High Polymers, Volume XVI, "Polyurethanes, Chemistry and Technology", by Saunders-Frisch, Interscience Publishers, New York, London, Volume I, 1962, pages 32 to 42 and pages 44 to 54 and Volume II, 1964, pages 5 to 6 and 189 to 199, and in the "Kunststoff-Handbuch", Volume VII, Vieweg-Hochtlen, Carl-Hanser-Verlag, Munich, 1966, e.g., on pages 54 to 71.

Mixtures of the above-mentioned compounds containing at least two hydroxyl groups having a molecular weight of from 400 to 10,000 may, of course, be used.

According to the invention, mixtures of compounds corresponding to the general formula

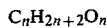
$C_nH_{2n+2}O_n$ wherein $n=2$ to 10,
which contain at least four hydroxyl groups on the statistical average, are used as additional starting components and act as cross-linking agents.

The mixtures of compounds corresponding to the general formula given above contain, for example, ethylene glycol, glycerine, erythritol, xylitol, sorbitol, mannitol and dulcitol.

Particularly preferred cross-linking mixtures include mixtures of lower molecular weight polyols obtained by reducing mixtures of hydroxy aldehydes and hydroxy ketones ("formose") of the type produced during the self-condensation of hydrated formaldehyde in the presence of metal compounds as catalysts and of compounds which are capable of enediol formation (German Offenlegungsschriften Nos. 2,714,084; 2,714,104; 2,721,186; 2,738,154; 2,756,270; 2,831,659; 2,738,512 which substantially correspond to U.S. applications Ser. Nos. 829,171; 829,167; 829,173; 934,650; 965,645; 55,654 and U.S. Pat. No. 4,156,636, respectively, in addition to German Offenlegungsschrift No. 2,619,084).

Cross-linking mixtures of the formose type often include, e.g., the following ranges of components:

$n=2$ dihydric alcohols from 0.1 to 20% by weight,
$n=3$ trihydric alcohols from 0.2 to 30% by weight,
$n=4$ tetrahydric alcohols from 0.2 to 40% by weight,
$n=5$ five-hydric alcohols from 1.0 to 40% by weight
$n=6$ six-hydric alcohols from 0.1 to 50% by weight,
$n=7$ seven-hydric and higher alcohols from 0.1 to 50% by weight.

The addition of water and/or urea and/or $\epsilon$-caprolactam to anhydrous formitol increases the flowing properties of the cross-linking mixture of the invention, thus making mechanical metering simple. These mixtures are so-called "associated formitols".

The cross-linking mixtures are added to the foaming mixture in a quantity of from 0.5 to 10 g, preferably 2 to 5 g, based on 100 g of the polyether.

In addition to the cross-linking agents of the invention, it is, of course, possible to use in amounts of from 0.5–10% by weight, preferably of from 1.0–5.0% by weight, based on the polyether, the lower molecular weight compounds known from polyurethane chemistry containing at least two hydrogen atoms which are reactive towards isocyanates, and having a molecular weight of 32 to 400.

Examples of such isocyanate reactive compounds include: ethylene glycol; propylene glycol-(1,2) and -(1,3); butylene glycol-(1,4) and -(2,3); pentanediol-(1,5); hexanediol-(1,6); octanediol-(1,8); neopentyl glycol; 1,4-bis-hydroxymethyl cyclohexane; 2-methyl-1,3-propanedione; trimethylolpropane; hexanetriol-(1,2,6); trimethylolethane; pentaerythritol; quinitol; diethylene glycol; triethylene glycol; tetraethylene glycol; polyethylene glycols having a molecular weight of up to 400; dipropylene glycol; polypropylene glycols having a molecular weight of up to 400; dibutylene glycol; polybutylene glycols having a molecular weight of up to 400; 4,4'-dihydroxydiphenylpropane and dihydroxymethyl-hydroquinone. Examples of compounds having at least two isocyanate reactive hydrogen atoms also include ethanolamine; diethanolamine; triethanolamine; 3-aminopropanol; ethylenediamine; 1,3-diaminopropane; 1-mercapto-3-amino-propane; 4-hydroxy- or -amino-phthalic acid; succinic acid; adipic acid; hydrazine; N,N'-dimethylhydrazine, 4,4'-diaminodiphenylmethane; toluylenediamine; methylene-bis-chloraniline; methylene-bis-anthranilic acid ester; diaminobenzoic acid ester and the isomeric chlorophenylenediamines.

Additionally, mixtures of various compounds containing at least two isocyanate reactive hydrogen atoms and having a molecular weight of from 32 to 400 may be used.

Small quantities of amino compounds having a molecular weight of from 32 to 400 may also be used.

Aliphatic diamines suitable for the process include, e.g., ethylene diamine; 1,4-tetramethylenediamine; 1,11-undecamethylenediamine; 1,12-dodecamethylenediamine and mixtures of the above aliphatic diamines. Suitable aliphatic diamines also include 1-amino-3,3,5-trimethyl-5-aminomethyl cyclohexane ("isophorone diamine"); 2,4- and 2,6-hexahydrotoluylene diamine and mixtures thereof; perhydro-2,4'- and 4,4'-diaminodiphenyl methane; p-xylylenediamine; bis-(3-aminopropyl)-methylamine; diamino-perhydroanthrazenes (German Offenlegungsschrift No. 2,638,731) and cycloaliphatic triamines of the type described in German Offenlegungsschrift No. 2,614,244. Hydrazine and substituted hydrazines such as methyl hydrazine; N,N'-dimethyl hydrazine and their homologs may be used as well as acid dihydrazides such as carbodihydrazide, oxalic acid dihydrazide and the dihydrazides of malonic acid, succinic acid, glutaric acid, adipic acid, β-methyl adipic acid, sebacic acid, hydracrylic acid and terephthalic acid. Semicarbazido-alkylene-hydrazides such as β-semicarbazide propionic acid hydrazide (German Offenlegungsschrift No. 1,770,591) and semicarbazidoalkylene carbazine esters, such as 2-semicarbazido ethylcarbazene ester (German Offenlegungsschrift No. 1,918,504) may be used. Amino-semicarbazide compounds such as β-aminoethyl-semicarbazidocarbonate (German Offenlegungsschrift No. 1,902,931) also may be used. The amino groups may be completely or partially blocked by aldimine or ketimine groups to control their reactivities U.S. Pat. No. 3,734,894 and German Offenlegungsschrift No. 2,637,115).

Examples of suitable aromatic diamines include bis-anthranilic acid esters according to German Offenlegungsschriften Nos. 2,040,644 and 2,160,590; 3,5- and 2,4-diamino benzoic acid esters according to German Offenlegungsschrift No. 2,025,900; the ester group-containing diamines described in Germen Offenlegungsschriften Nos. 1,803,635 (U.S. Pat. Nos. 3,681,290 and 3,736,350), 2,040,650 and 2,160,589; the diamines containing ether groups according to German Offenlegungsschriften Nos. 1,770,525 and 1,809,172 (U.S. Pat. Nos. 3,654,364 and 3,736,295) and 2-halogen-1,3-phenylene diamines which may be substituted in the 5-position (German Offenlegungsschriften Nos. 2,001,772; 2,025,896 and 2,065,869) such as 3,3'-dichloro-4,4'-diaminodiphenyl methane. Suitable aromatic diamines also include toluylene diamine; 4,4'-diaminodiphenyl methane; 4,4'-diaminodiphenyl disulfides (German Offenlegungsschrift No. 2,404,976); diaminodiphenyl dithioether (German Offenlegungsschrift No. 2,509,404); aromatic diamines which are substituted by alkyl thio groups (German Offenlegungsschrift No. 2,638,760); diamino benzene phosphonic acid esters (German Offenlegungsschrift No. 2,459,491); aromatic diamines containing sulfonate or carboxylate groups (German Offenlegungsschrift No. 2,720,166) and the high-melting diamines listed in German Offenlegungsschrift No. 2,635,400. The amino alkyl thioanilines described in German Offenlegungsschrift No. 2,734,574 are examples of aliphatic-aromatic diamines suitable for the process.

Compounds such as 1-mercapto-3-aminopropane; optionally substituted amino acids, such as glycine, alanine, valine, serine and lysine; and optionally substituted dicarboxylic acids, such as succinic acid, adipic acid, phthalic acid, 4-hydroxy phthalic acid and 4-amino phthalic acid may also be used in the invention as chain extenders.

In addition, compounds which are monofunctional towards isocyanates may be used in proportions of from 0.1 to 10% by weight, based on solid polyurethane as chain breakers. Examples of monofunctional compounds used as chain breakers include monoamines such as butyl and dibutyl amine, octylamine, stearyl amine, N-methyl stearyl amine, pyrrolidine, piperidine and cyclohexyl amine. They also include monoalcohols such as butanol, 2-ethyl hexanol, octanol, dodecanol, cyclohexanol, the various amyl alcohols and ethylene glycol monoethyl ethers.

Other lower molecular weight polyols having molecular weights of up to 400 which may be used in the invention include ester diols corresponding to the general formulas

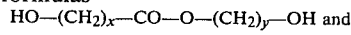

and

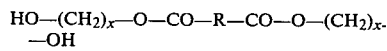

in which
R represents an alkylene radical with 1 to 10, preferably 2 to 6 carbon atoms; or a cycloalkylene or arylene radical with 6 to 10 carbon atoms;
x=2 to 6; and
y=3 to 5.

Examples of such ester diols include δ-hydroxybutyl-γ-hydroxy-capronic acid ester, ω-hydroxyhexyl-γ-hydroxybutyric acid ester, adipic acid-bis-(β-hydroxyethyl)ester and terephthalic acid-bis-(β-hydroxyethyl) ester.

Lower molecular weight polyols having a molecular weight of up to 400 which may be used in the invention also include diol urethanes corresponding to the general formula

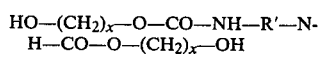

in which
R' represents an alkylene radical with 2 to 15, preferably 2 to 6 carbon atoms; or a cycloalkylene or arylene radical with 6 to 15 carbon atoms and
x represents a number between 2 and 6.

Diol ureas having molecular weights up to 400 corresponding to the general formula

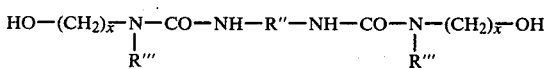

in which
R" represents an alkylene radical with 2 to 15, preferably 2 to 9 carbon atoms; or a cycloalkylene or arylene radical with 6 to 15 carbon atoms;
R''' represents hydrogen or a methyl group; and
x represents the numbers 2 or 3
may be used as the lower molecular weight polyol. Examples of such diol ureas include 4,4'-diphenylmethanebis-(β-hydroxyethyl urea) or the compound

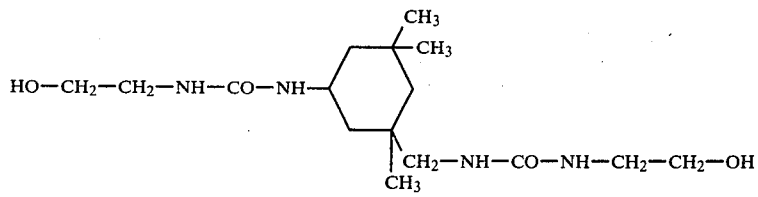

For some purposes, it is advantageous to use polyols which contain sulfonate and/or phosphonate groups (German Offenlegungsschrift No. 2,719,372), preferably the adduct of bisulfite to 1,4-butane diol or to its alkoxylation products.

The following auxiliaries and additives optionally may be used.

(a) Readily volatile inorganic or organic substances may be used as blowing agents. Examples of organic blowing agents include acetone, ethylacetate, halogen-substituted alkanes such as methylene chloride, chloroform, ethylidenechloride, vinylidenechloride, monofluorotrichloromethane, chlorodifluoromethane, dichlorodifluoromethane, butane, hexane, heptane and diethylethers. Examples of inorganic blowing agents include air, $CO_2$ and $N_2O$. A blowing effect may also be achieved by adding compounds which decompose at temperatures above room temperature with the elimination of gases, such as nitrogen and azo compounds such as azo dicarboxylic amide and azo isobutyric acid nitrile. Other examples of blowing agents as well as details about their use are described in Kunststoff-Handbuch, Volume VII, edited by Vieweg and Hochtlen, Carl-Hanser-Verlag, Munich, 1966, e.g. on pages 108 and 109, 453 to 455 and 507 to 510.

(b) Catalysts of the type generally known may be used. Examples include tertiary amines such as triethylamine; tributylamine; N-methyl-morpholine; N-ethyl-morpholine; N,N,N',N'-tetramethyl-ethylene diamine; pentamethyl-diethylene triamine and higher homologs (German Offenlegungsschriften Nos. 2,624,527 and 2,624,528); 1,4-diazobicyclo-(2,2,2)-octane; N-methyl-N'-dimethylaminoethyl-piperazine; bis-(dimethylaminoalkyl)-piperazines (German Offenlegungsschrift No. 2,636,787); N,N-dimethyl-benzyl-amine; N,N-dimethylcyclohexylamine; N,N-diethylbenzylamine; bis-(N,N-diethylaminoethyl)adipate; N,N,N'-tetramethyl-1,3-butanediamine; N,N-dimethyl-β-phenylethylamine; 1,2-dimethylimidazole; 2-methylimidazole; monocyclic and dicyclic amidines (German Offenlegungsschrift 1,720,633); bis-(dialkylamino)-alkylethers (U.S. Pat. No. 3,330,782, German Auslegeschrift No. 1,030,558, German Offlegungsschriften Nos. 1,804,361 and 2,618,280). Tertiary amines containing amide groups, preferably formamide groups (German Offenlegungsschriften Nos. 2,523,633 and 2,732,292) optionally may be used. Suitable catalysts also include Mannich bases generally known including secondary amines such as dimethyl amine; aldehydes, preferably formaldehyde; ketones such as acetone, methylethyl ketone or cyclohexanone; and phenols such as phenol, nonyl phenol and bisphenol.

Tertiary amines containing isocyanate reactive hydrogen atoms include triethanol amine; triisopropanol amine; N-methyl-diethanol-amine; N-ethyl-diethanol amine; N,N-dimethyl-ethanol amine; and the reaction products of these tertiary amines with alkylene oxides such as propylene oxide and/or ethylene oxide. Secondary tertiary amines described in German Offenlegungsschrift 2,732,292 may also be used.

Suitable catalysts also include silaamines with carbon-silicon bonds of the type described in German Pat. No. 1,299,290 (corresponding to U.S. Pat. No. 3,620,984), such as 2,2,4-trimethyl-2-silamorpholine and 1,3-diethyl-aminomethyl-tetramethyl-disiloxane.

Nitrogen-containing bases such as tetraalkyl ammonium hydroxides, alkali hydroxides such as sodium hydroxide, alkali phenolates such as sodium phenolate and alkali alcoholates such as sodium methylate may be used as catalysts. Hexahydrotriazines also may be used as catalysts (German Offenlegungsschrift No. 1,769,043).

The reaction between isocyanate groups and Zerewitinoff-active hydrogen atoms can be greatly accelerated by lactams and azalactams due to an association which is initially formed between the lactam and the compound containing acidic hydrogen. Associations of this type and their catalytic action are described in German Offenlegungsschriften Nos. 2,062,288; 2,062,289; 2,129,198; 2,330,175; 2,330,211 and 2,117,576 (U.S. Pat. No. 3,758,444).

Organometallic compounds, in particular organotin compounds may be used as catalysts in the invention.

Suitable organotin compounds include, preferably, tin(II)-salts of carboxylic acids such as tin(II)-acetate, tin(II)-octoate, tin(II)-ethylhexoate and tin(II)-laurate and tin(IV)-compounds such as dibutyl tin oxide, dibutyl tin dichloride, dibutyl tin diacetate, dibutyl tin dilaurate, dibutyl tin maleate and dioctyl tin diacetate. Suitable organotin compounds also include sulfur-containing compounds such as di-n-octyl-tin-mercaptide (German Auslegeschrift No. 1,769,367 and U.S. Pat. No. 3,645,927).

All the above-mentioned catalysts may be used as mixtures. Combinations of organometallic compounds and amidines, amino pyridines or hydrazino pyridines are particularly preferred (German Offenlegungsschriften Nos. 2,434,185; 2,601,082 and 2,603,834).

Other examples of catalysts which may be used in the invention as well as details about the way these catalysts work are described in "Kunststoff-Handbuch", Volume VII, edited by Vieweg und Hochtlen, Carl-Hanser-Verlag, Munich, 1966, e.g. on pages 96 to 102.

The catalysts are generally used in a quantity of 0.001 to 10% by weight, based on the polyethers.

(c) Surface-active additives such as emulsifiers and foam stabilizers may be used. Suitable emulsifiers include, for example, the sodium salts of castor oil sulfonates and salts of fatty acids with amines such as oleic acid diethylamine and stearic acid diethanol amine. Alkali or ammonium salts of sulfonic acids such as dodecyl benzene sulfonic acid or dinaphthyl methane disulfonic acid may be used. The alkali or ammonium salts of fatty acids such as ricinoleic acid or of polymeric fatty acids may also be used as surface-active additives.

Suitable foam stabilizers include polyether siloxanes, particularly water-soluble substitutes. These compounds generally are prepared so that a copolymer of ethylene oxide and propylene oxide is joined to a polydimethylsiloxane radical. Foam stabilizers of this type are described in U.S. Pat. Nos. 2,834,748; 2,917,480 and 3,629,308. Polysiloxane polyoxyalkylene copolymers which are branched over allophanate groups described in German Offenlegungsschrift 2,558,523 are particularly preferred in many cases.

(d) Reaction retarders including acidically reacting substances such as hydrochloric acid or organic acid halides may be used in the invention. Cell regulators of the type generally known such as paraffins, fatty alcohols and dimethyl polysiloxanes may be used as well as pigments, dyes and flameproofing agents of the type generally known, such as trischloroethyl phosphate, tricresyl phosphate, ammonium phosphate and polyphosphate. Suitable stabilizers against the effects of aging and weathering, plasticizers and substances having a fungistatic and bacteriostatic effect as well as fillers such as barium sulfate, kieselguhr, carbon black or whiting also may be used.

Examples of surface-active additives which optionally may be used in the invention, foam stabilizers, cell regulators, reaction retarders, stabilizers, flame-retarding substances, plasticizers, dyes, fillers, substances having a fungistatic and bacteriostatic effect and details about the mode of use and action of these additives are described in the "Kunststoff-Handbuch", Volume VII, edited by Vieweg und Hochtlen, Carl-Hanser-Verlag, Munich, 1966, e.g. on pages 103 to 113.

The instant process may be carried out as follows.

The components are reacted using a generally known single stage process, a prepolymer process or a semi-prepolymer process. Mechanical devices are often used, such as the devices described in U.S. Pat. No. 2,764,565. Details about suitable additional processing devices are described in the "Kunststoff-Handbuch", Volume VII, edited by Vieweg und Hochtlen, Carl-Hanser-Verlag, Munich, 1966, for example on pages 121 to 205.

During mechanical foaming, the cross-linking mixture used in the invention can be added using a separate line or with the polyethers.

Cold-hardening foams can be prepared using the instant process (cf. British Pat. No. 1,162,517 and German Offenlegungsschrift 2,153,086).

The foams produced using the process of the invention are suitable for padding materials, mattresses, packing materials, foils for bonding processes and as insulating materials. Additionally, these highly elastic foams are suitable for making flame laminated combinations with foils, woven fabrics and knitted fabrics made of natural and synthetic materials. Foils made of these foams can also be combined with above mentioned materials using high frequency and ultrasonic processes.

The process of the invention is illustrated by but not limited to the following Examples. In all the Examples and Comparison Examples, density was determined using DIN 53420, compression hardness at 40% compression using DIN 53577 and compression set at 90% compression using DIN 53572.

EXAMPLES

Production of the cross-linking agent using the invention (Examples A and B).

EXAMPLE A 3051 g ε-caprolactam are mixed with 7365 g anhydrous formitol having an average functionality of about 4 (produced in accordance with Example 3 of German Offenlegungsschrift 2 756 270 using as starting material a 50% aqueous solution of formose obtained according to the general preparation techniques of example 1 of German Offenlegungsschrift 2 721 186) and having the following distribution of components:
Compounds with
  2 C-atoms: 3.9% by weight
  3 C-atoms: 20.7% by weight
  4 C-atoms: 24.1% by weight
  5 C-atoms: 22.4% by weight
  6 C-atoms: 22.0% by weight
  7 and more C-atoms: 6.8% by weight
and 593 g water are heated to 60° C. The homogeneous mixture is stirred for one hour at 60° C. 10,999 g of the cross-linking agent are obtained after cooling. The cross-linking agent has a water content of 5.3% by weight.

EXAMPLE B 210 g urea, 954 g formitol as used in Example A and 29.85 g water are mixed and heated to 60° C. with stirring. The mixture is stirred for one hour at 60° C. 1193.85 g of a cross-linking agent are obtained after cooling. The crosslinking agent has a water content of 2.5% by weight.

EXAMPLE 1

A mixture consisting of:
100 parts by weight of a commercially available poly-(oxyethylene-oxypropylene)-triol having an average molecular weight of 5000 and an OH number of 35 (® Desmophen 3900 of Bayer AG, Germany),
3.2 parts by weight of water,
0.2 parts by weight of triethylenediamine,
3.2 parts by weight of diisopropanolamine,
0.6 parts by weight of diethanolamine,
0.3 parts by weight of a chlorine-containing polysiloxane stabilizer (stabilizer KS 53 of Bayer AG, Germany),
2.0 parts by weight of trichloroethylphosphate and
5 parts by weight of associated formitol in accordance with Example A
is reacted in an open container with 65.3 parts by weight of an allophanatized toluylene diisocyanate having an NCO content of 40.5% by weight. An open-celled, non-shrinking foam article is produced having the following mechanical properties: a density of 35 kg/m$^3$ (DIN 53420), a compression hardness at 40% compression of 5.9 kPa (DIN 53577), a compression set at 90% compression of 10.1% (DIN 53572).

EXAMPLE 2

A mixture as described in Example 1 is reacted in an open container with 5 parts by weight of associated formitol according to Example B and 65.9 parts by weight of the isocyanate described in Example 1. An open-celled, non-shrinking highly elastic foam composition is formed, having the following mechanical properties: a density of 34 kg/m$^3$, a compression hardness at 40% compression of 5.6 kPa, a compression set at 90% compression of 11.0%.

EXAMPLE 3

A mixture consisting of:
100 parts by weight of a commercially available poly-(oxyethylene-oxypropylene) triol having an average molecular weight of 6000 and a hydroxyl number of 28 (® Desmophen trial product PU 3119 of Bayer AG, Germany),
3.2 parts by weight of water,
0.15 parts by weight of triethylene diamine,
3.0 parts by weight of diisopropanol amine,
0.8 parts by weight of diethanol amine,
0.3 parts by weight of stabilizer (as described in Example 1)
2.0 parts by weight of trichloroethyl phosphate and
5.0 parts by weight of associated formitol according to Example A
is reacted with 64.2 parts by weight of the isocyanate described in Example 1 on a continuous block foaming apparatus of the UBT type. An open-celled, non-shrinking foam is produced, having the following mechanical properties: a density of 35 kg/m$^3$, a compression hardness at 40% compression of 4.0 kPa, a compression set at 90% compression of 6.7% and a SAG factor of 3.1.

EXAMPLE 4

A mixture as described in Example 3 is reacted with 5 parts by weight of associated formitol according to Example B and with 64.6 parts by weight of the isocyanate described in Example 1 on a continuous block foaming apparatus of the UBT type. An open-celled, non-shrinking foam is produced having the following mechanical properties: a density of 35 kg/m$^3$, a compression hardness at 40% compression of 4.1 kPa, a compression set at 90% compression of 6.4% and a SAG factor of 3.1.

EXAMPLE 5

A mixture of:
100 parts by weight of a polyether as described in Example 3,
3.1 parts by weight of water,
0.2 parts by weight of triethylenediamine,
2.4 parts by weight of diisopropanol amine,
1.0 parts by weight of diethanolamine,
0.5 parts by weight of stabilizer as described in Example 1 and
5 parts by weight of formitol having an average functionality of 4.0 (according to Example 3 of German Offenlegungsschrift No. 2,756,270) and having the following component distribution:
Compounds with
  2 C-atoms: 3.9% by weight
  3 C-atoms: 20.7% by weight
  4 C-atoms: 24.1% by weight
  5 C-atoms: 22.4% by weight
  6 C-atoms: 22.0% by weight
  7 and more C-atoms: 6.8% by weight
is reacted in an open container with 64.4 parts by weight of the isocyanate described in Example 1. An open-celled, non-shrinking, highly elastic foam is produced, having the following mechanical properties: a density of 36 kg/m$^3$, a compression hardness of 40% compression of 3.9 kPa, and a compression set at 90% compression of 4.8%.

EXAMPLE 6

A mixture of the type described in Example 5 in which 5 parts by weight of formitol having an average functionality of 6 (according to Example 16 [where a hydrogenated "formose D" of an average functionality of 6 is prepared] of German Offenlegungsschrift No. 2 831 659) is substituted for 5 parts by weight of the formitol of average functionality of 4 used in Example 5, the formitol having the average functionality of 6 having the following distribution of components:
Compounds with
  2 C-atoms: 0.15% by weight
  3 C-atoms: 0.6% by weight
  4 C-atoms: 1.3% by weight
  5 C-atoms: 11.5% by weight
  6 C-atoms: 39.3% by weight
  7 C-atoms: 37.6% by weight
  8 or more C-atoms: 9.5% by weight
is reacted in an open container with 20% by weight of water according to the invention and 67.2 parts by weight of the isocyanate described in Example 1. An open-celled, non-shrinking, highly elastic foam having the following mechanical properties is produced: a density of 36 kg/m$^3$, a compression hardness at 40% compression of 6.8 kPa, a compression set at 90% compression of 6.0% and a SAG factor of 2.6.

COMPARISON EXAMPLE 7A

A mixture of:
100 parts by weight of a poly(oxyethylene-oxypropylene) triol which contains 5% of a polyurea dispersion and which has a hydroxyl number of 33,
3.5 parts by weight of water,
0.15 parts by weight of triethylene diamine,
1.5 parts by weight diethanol amine,
0.5 parts by weight of stabilizer (as described in Example 1),
2.0 parts by weight of trichloroethylphosphate,
5 parts by weight of associated formitol according to Example B and
0.1 parts by weight tin dioctoate
is reacted in an open container with 54.2 parts by weight of toluylene diisocyanate with an 80/20 ratio of the 2,4- to 2,6-isomers. An open-celled, non-shrinking, highly elastic foam composition is produced with the following mechanical properties: a density of 28 kg/m$^3$, a compression hardness at 40% compression of 2.1 kPa and a compression set at 90% compression of 9.2%.

COMPARISON EXAMPLE 7B

A comparison foam made in the same way as in Comparison Example 7A except without the 5 parts by weight of associated formitol, taking into consideration the formulation of the smaller quantity of toluylene diisocyanate required for this purpose (now 46.9 parts by weight), has the following mechanical properties: a density of 26 kg/m$^3$, a compression hardness at 40% compression of 2.2 kPa and a compression set at 90% compression of 7.6%.

The following Table shows the highly elastic qualities of the foams of Examples 1 to 6 using generally known additive plus the additive of the invention compared to the elastic qualities of comparison foams described below the Table using generally known additives but without the additives of the invention.

TABLE

|  | Ex. 1 | Ex. 2 | Ex. 3 | Ex. 4 | Ex. 5 | Ex. 6 | Comp 1 | Comp 2 | Comp 3 |
|---|---|---|---|---|---|---|---|---|---|
| Density (kg/m$^3$) | 35 | 34 | 35 | 35 | 36 | 36 | 33 | 36 | 35 |
| Compression hardness at 40% compression (kPa) | 5.9 | 5.6 | 4.0 | 4.1 | 3.9 | 6.8 | 1.8 | 3.1 | 3.5 |
| Compression set at 90% compression (%) | 10.1 | 11.0 | 6.7 | 6.4 | 4.8 | 6.0 | 2.3 | 2.4 | 8.6 |
| SAG factor | — | — | 3.1 | 3.1 | — | 2.6 | 3.1 | 2.9 | 2.7 | in which:

Comparison 1 contains a formulation according to Example 1 without cross-linking agent (formitol or associated formitol) and the quantity of isocyanate to be used for this purpose (as described in Example 1), Comparison 2 contains the same formulation as Comparison 1 but with 3 parts by weight of glycerine and the quantity of isocyanates to be used for this purpose, Comparison 3 contains a formulation based on a commercially available poly(oxyethylene-oxypropylene) triol, which contains 20% polyurea dispersion [®Desmophen 7519 W of Bayer AG, Germany], and toluylene diisocyanate with an 80/20 ratio of the 2,4- to 2,6-isomers as described in Comparison Example 7A.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of highly elastic foams containing urethane groups and having increased impression hardness by reacting polyethers containing at least two hydroxyl groups having a molecular weight of 400 to 10,000 with modified polyisocyanates which contain carbodiimide groups, urethane groups, allophanate groups, isocyanurate groups, urea or biuret groups or combinations thereof in the presence of cross-linking agents and water and optionally in the presence of catalysts, emulsifiers, stabilizers, organic blowing agents and other auxiliaries and additives, characterized in that the reaction is carried out in the presence of 0.5 to 10 g/100 g of the polyether of a cross-linking mixture corresponding to the general formula $$C_nH_{2n+2}O_n$$

wherein $n = 2$ to 10,
which contains on a statistical average at least four hydroxyl groups per molecule.

2. The process of claim 1, characterized in that water is added to said cross-linking mixture in a quantity of 5 to 50 g/100 g of said cross-linking agents.

3. A process according to claim 1, characterized in that urea is added to said cross-linking mixture in a quantity of 5 to 30 g/100 g of said cross-linking agents.

4. A process according to claim 2, characterized in that urea is added to said cross-linking mixture in a quantity of 5 to 30 g/100 g of said cross-linking agents.

5. A process according to claim 1, characterized in that ε-caprolactam is added to said cross-linking mixture in a quantity of 10 to 40 g/100 g of said cross-linking agents.

6. A process according to claim 2, characterized in that ε-caprolactam is added to said cross-linking mixture in a quantity of 10 to 40 g/100 g of said cross-linking agents.

7. A polyurethane foam produced by the process of claim 1.

8. The process of claim 1, wherein the modified polyisocyanate is derived from an isocyanate taken from the group consisting of toluylene diisocyanate, 4,4'-diphenylmethane diisocyanate, 2,4'-diphenylmethane diisocyanate and mixtures thereof.

* * * * *